Ferris & Bacon,
Unsetting Tires.

No. 44,172. Patented Sept. 13, 1864.

Witnesses:

Inventor:

UNITED STATES PATENT OFFICE.

JAMES FERRIS AND WILLIAM E. BACON, OF LITCHFIELD, ILLINOIS.

IMPROVED DEVICE FOR SHRINKING TIRES.

Specification forming part of Letters Patent No. 44,172, dated September 13, 1864.

*To all whom it may concern:*

Be it known that we, JAMES FERRIS and WILLIAM E. BACON, of Litchfield, in the county of Montgomery and State of Illinois, have invented a new and Improved Device for Shrinking Tires; and we do hereby declare that the following is a full, clear, and exact description thereof, which will enable others skilled in the art to make and use the same, reference being had to the accompanying drawings, forming a part of this specification, in which—

Figure 1:
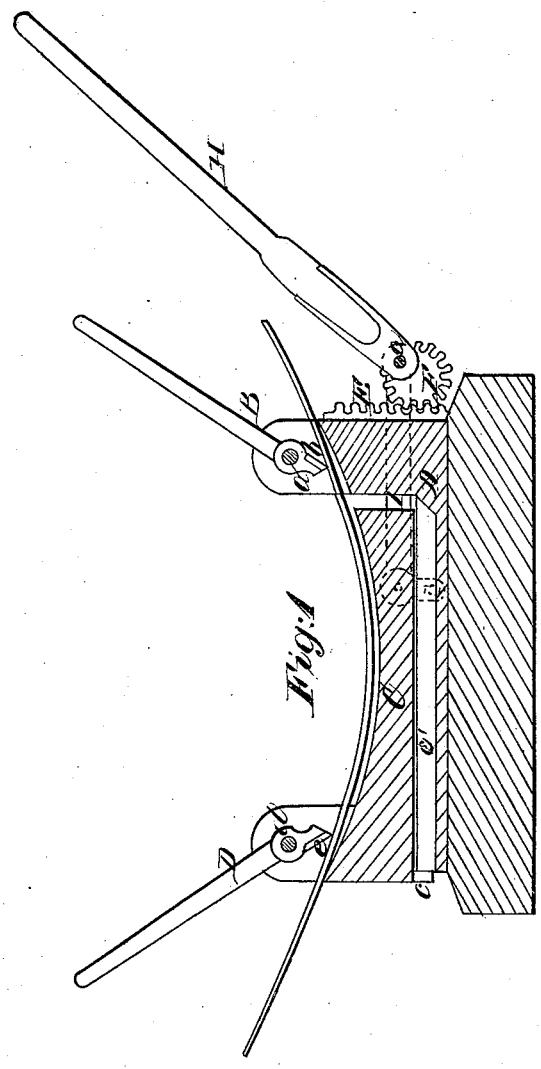
Figure 2:
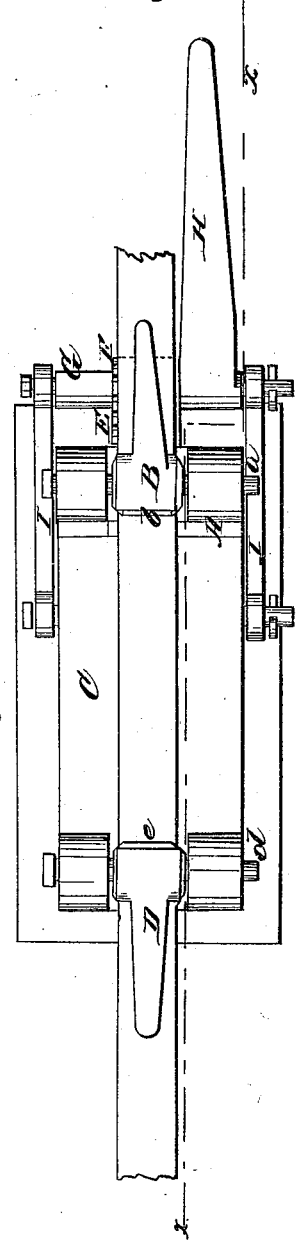

Figure 1 is a side sectional view of our invention, taken in the line $x\,x$, Fig. 2; Fig. 2, a plan or top view of the same.

Similar letters of reference indicate like parts.

This invention relates to a new and improved device for shrinking tires for wheels, in order to avoid the trouble and expense of cutting and rewelding the tires in case of the shrinking of the wheels.

The invention consists in the employment or use of a stationary and a sliding bed, each of which is provided with a dog, and operating the sliding bed through the medium of a lever and shaft, the latter being provided with a fixed eccentric pinion and a vertical rack on the end of the stationary bed, the shaft having its ends connected by right-angled straps with the sliding bed, all being arranged in such a way as to perform the desired work expeditiously and in a thorough manner.

A represents a stationary bed, provided at one end with a vertical ledge or projection, in the upper part of which a lever or dog, B, is fitted on a fulcrum-pin, $a$, the lower end of said lever or dog being provided with a steel chisel-shaped blade, $b$.

C is a sliding bed, which is provided at its bottom with a longitudinal recess, $c$, to receive a longitudinal rib, $c'$, on the bed A, and serve as a guide for the bed C. The bed C has its upper surface of concave form, the curvature corresponding to that of the tire to be operated upon, and said bed C is also provided at its outer end with a vertical ledge or projection, in which a lever or dog, D, is fitted on a fulcrum-pin, $d$, the lever or dog being precisely similar to the lever or dog B, and provided with a steel blade, $e$, at its lower end.

The recesses in the ledges in which the dogs are fitted are curved at their bottoms to correspond to the curvature of the upper surface of the sliding bed C.

On the end of the stationary bed A there is a vertical rack, E, in which a fixed pinion, F, placed eccentrically on a shaft, G, gears, said shaft having a lever, H, attached to it. To the ends of this shaft G there are connected right-angled or bent straps I I, which are pivoted at their angles to the sliding bed C, one at each side, the lower ends of said straps being fitted on pins connected to the stationary bed A, so as to work thereon freely.

The operation is as follows: The levers or dogs B D are removed and the tire heated at the part where it is to be shrunk. The heated part of the tire is placed on the bed C, and the dog D placed in position and adjusted so as to clamp the tire. The lever H is then raised and the sliding bed C forced outward a requisite distance. The other dog, B, is then placed in position and made to clamp the tire, and the lever H pressed down, which causes the bed C to be drawn inward and the heated portions between the dogs shrunk or upset.

By arrangement of the lever, eccentric pinion, shaft, and right-angled straps a good purchase or leverage power is obtained to operate the sliding bed C, and the heated portion of the tire in being shrunk or upset is not liable to "kink," but will remain, while being acted upon, closely in contact with the concave surface of the sliding bed.

Having thus described our invention, we claim as new and desire to secure by Letters Patent—

1. The stationary and sliding beds A C, in combination with the dogs B D, and the concave upper surface of the bed C, all constructed and arranged substantially as and for the purpose specified.

2. The lever H, provided with the shaft G, and eccentric pinion F, in combination with the rack E and the right-angled straps I I, attached to the beds A C, and all arranged, substantially as shown, for operating the bed C.

JAMES FERRIS.
WILLIAM E. BACON.

Witnesses:
S. E. ALDEN,
B. C. BEARDSLEY.